W. S. R. THRUSH.
GRAIN DRILL.
APPLICATION FILED MAR. 22, 1911.

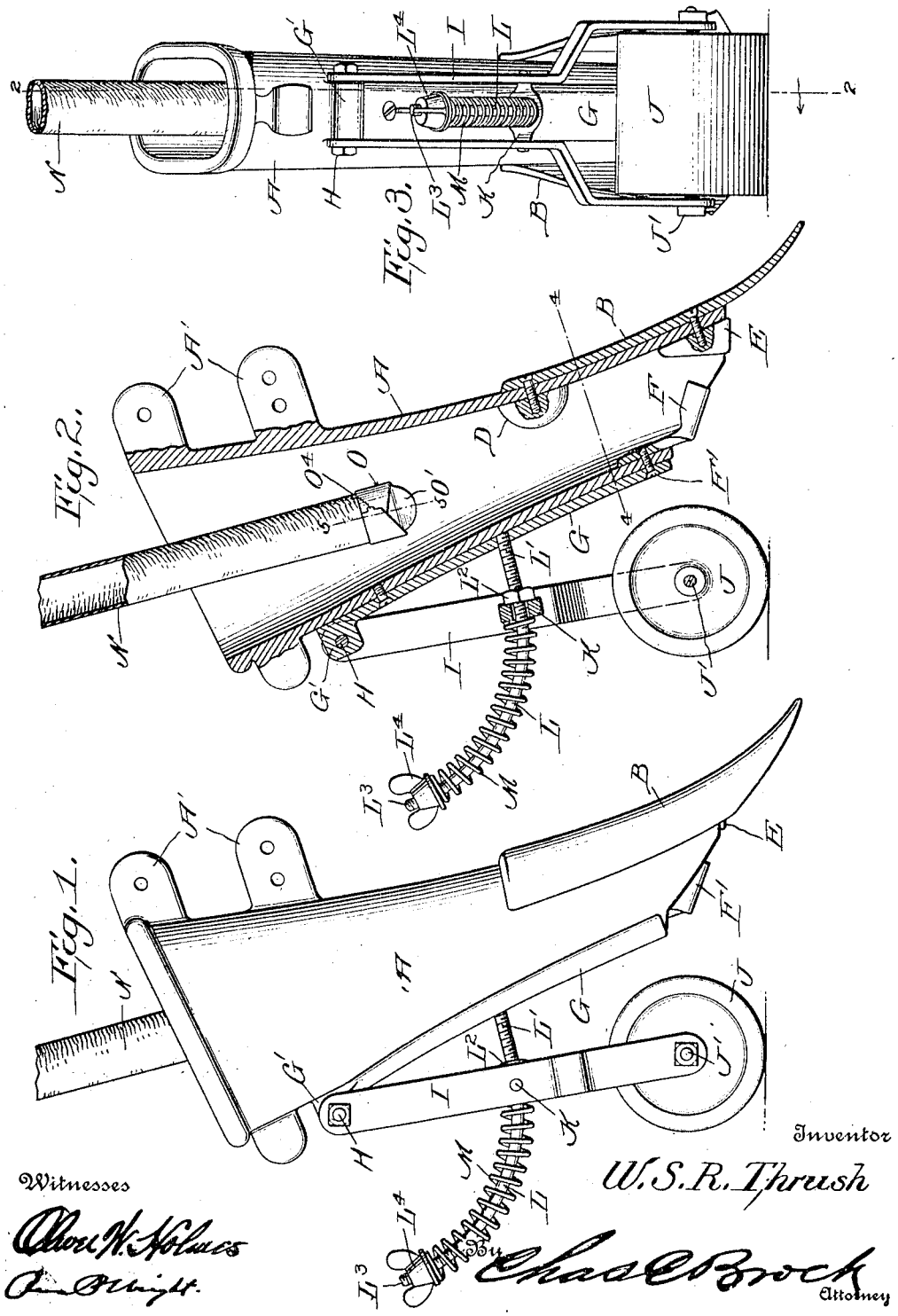

1,021,017.

Patented Mar. 26, 1912.
2 SHEETS—SHEET 2.

Witnesses

Inventor
W. S. R. Thrush
Chas E Brock
Attorney

UNITED STATES PATENT OFFICE.

WILLIAM S. R. THRUSH, OF CARLISLE, PENNSYLVANIA.

GRAIN-DRILL.

1,021,017.   Specification of Letters Patent.   Patented Mar. 26, 1912.

Application filed March 22, 1911. Serial No. 616,161.

*To all whom it may concern:*

Be it known that I, WILLIAM S. R. THRUSH, a citizen of the United States, residing at Carlisle, in the county of Cumberland and State of Pennsylvania, have invented a new and useful Improvement in Grain-Drills, of which the following is a specification.

This invention relates to certain new and useful improvements in grain drills, and more particularly to the boot, the object being to provide a boot which is provided with deflectors for scattering the grain so as to prevent the same from becoming bunched in the furrow, so that all difficulties now existing with devices of this character will be overcome.

Another object of my invention is to provide a boot with a shovel of a greater width than shovels now employed so as to form a wider furrow to receive the scattered grain.

Another object of my invention is to provide a pressing roller in connection with the boot, whereby the furrow will be closed and the soil pressed over the same.

Another object of my invention is to provide a grain tube with a deflector at its lower end in order to scatter the grain into the boot.

With these objects in view, the invention consists in the novel features of construction, combination and arrangement of parts, hereinafter fully described and pointed out in the claims.

Figure 4:
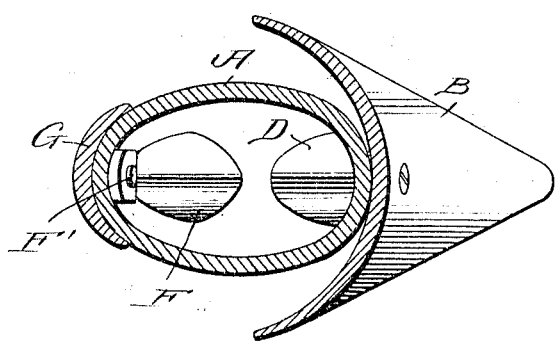
Figure 5:
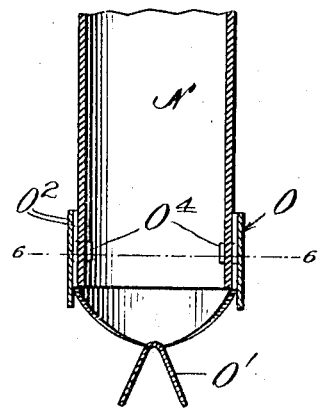
Figure 6:
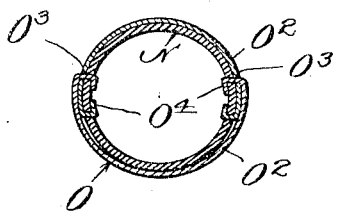
Figure 7:
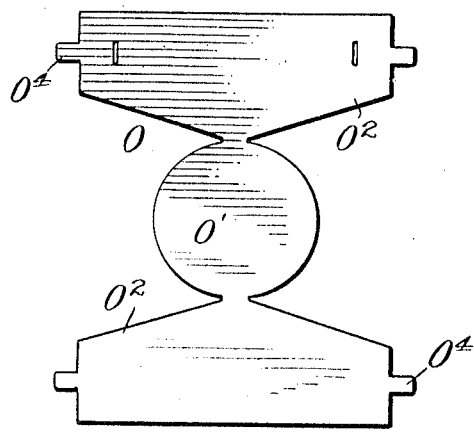

In the drawing forming a part of this specification:—Figure 1 is a side elevation of my improved drill boot. Fig. 2 is a longitudinal section through the boot on the line 2—2 of Fig. 3, a roller being shown in elevation. Fig. 3 is a rear elevation. Fig. 4 is a section taken on line 4—4 of Fig. 2. Fig. 5 is an enlarged detail section on the line 4—4 of Fig. 2. Fig. 6 is a section taken on line 6—6 of Fig. 5, and Fig. 7 is a plan view of the blank from which the deflector is formed.

In carrying out my improved invention, I employ a metal boot A which is formed with apertured lugs A' at its forward end for connecting the same to the drag-bar of the planter not shown. Secured to the front of the boot at its lower end is a shovel B which is fastened thereto by screws that extend through the boot into the deflectors D and E, the deflector D being semi-spherical in order to scatter the grain within the boot, and the deflector E which is arranged at the lower end is also rounded so that grain passing down the boot will strike the same and be spread outwardly to each side. Secured to the inside of the boot opposite the deflector E is a deflector F so that the grain passing down the rear wall of the boot will also be spread outwardly to each side, and said deflector is secured therein by a screw F' which also holds a plate G in position on the boot, said plate being secured adjacent its upper end by an additional screw, so that the same will be fastened thereto.

The plate G is provided with an apertured lug G' at its upper end through which extends a bolt H on which is pivotally mounted the upper ends of the frame I. The frame I carries a pressing roller J at its lower end which is journaled on a bolt J' extending transversely through the side bars of the frame, said roller is adapted to travel in the rear of the boot in such a manner that the soil will be forced back into the furrow and pressed in order to cover the grain deposited therein.

For holding the press roller under tension, I provide the frame I with a cross bar K having an aperture through which extends a curved bolt L which is provided with a threaded portion L' on which is mounted a nut $L^2$ forming a stop for limiting the movement of the frame toward the boot. The bolt L' is carried by the plate G, and is provided with a threaded end $L^3$ on which is mounted a ring nut $L^4$ adapted to engage the outer end portion of the coiled spring M which surrounds the bolt between the nut and cross bar K as clearly shown in Fig. 2.

Extending into the boot is a grain tube N which may be of the ordinary construction, and is preferably formed of fabric and rubber, and secured on the lower end of said tube is a distributer O which scatters the grain passing through the tube into the boot in such a manner that the grain will be thoroughly scattered before it leaves the boot, and deposited into the furrow in order to prevent the grain from becoming bunched. The distributer O is formed of a blank of sheet metal cut in the shape shown in Fig. 7, and comprises a central circular portion O' and end oblong portions $O^2$ which are provided with openings $O^3$ and tongues $O^4$ which are adapted to be forced through the openings into the tube and clenched as shown in Fig. 6 in order to secure the same in position on the end of the tube. The circular portion O' is bent so as to form a substantially inverted V in order to deflect the grain out to each side so that when the grain leaves the tube it will be scattered within the boot.

What I claim is:—

1. A grain drill comprising a boot having a shovel at its forward end of a greater width than the boot, a series of deflectors arranged within the boot, and a grain tube extending into said boot having a distributer at its lower end.

2. A grain drill comprising a boot, a distributer extending into said boot, deflectors arranged within the boot and below the plane of the distributer, and a shovel secured upon the front side of the boot, the said shovel and the deflectors being held in place by common securing means.

3. A device of the kind described comprising a boot, a distributer extending downwardly into the boot, oppositely arranged deflectors secured at the lower end of the boot, a semi-spherical deflector secured within and upon the front side of the boot midway the deflectors first mentioned and the lower end of the distributer, and a shovel secured upon the front side of the boot and extending below the lower end of the boot.

WILLIAM S. R. THRUSH.

Witnesses:
A. R. Allen,
J. C. Eckels.